No. 727,825. PATENTED MAY 12, 1903.
J. McCALLUM.
WAGON WHEEL.
APPLICATION FILED JULY 11, 1901.
NO MODEL.
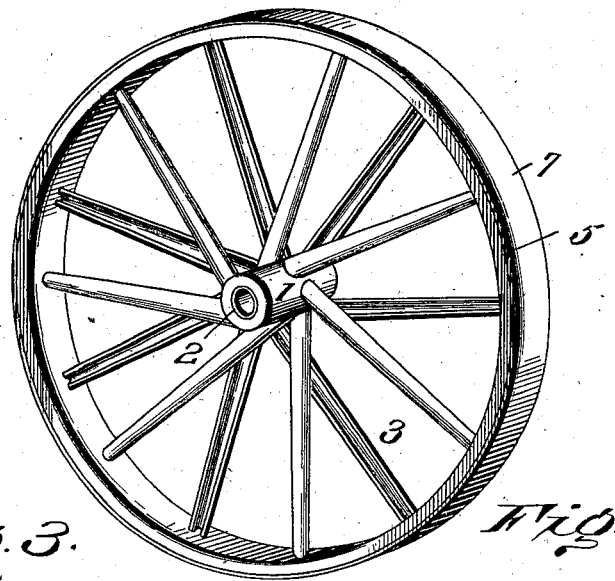
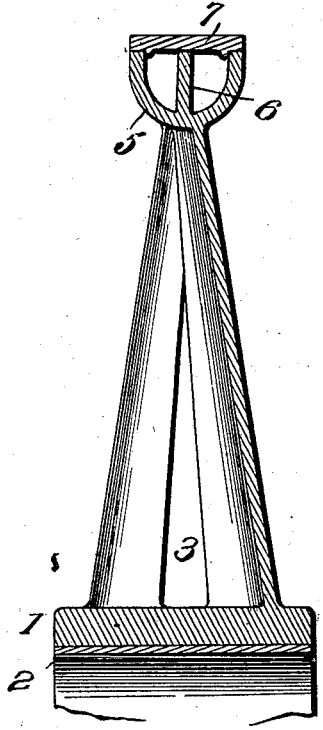
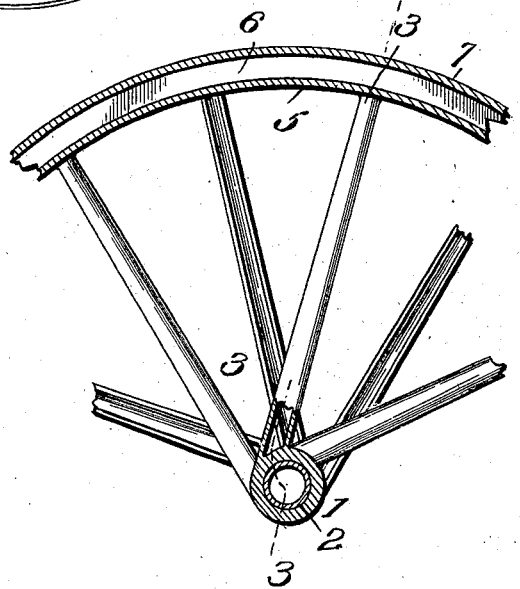
Witnesses
Inventor
James McCallum
By
Attorneys No. 727,825. Patented May 12, 1903.

UNITED STATES PATENT OFFICE.

JAMES McCALLUM, OF AURORA, ILLINOIS.

WAGON-WHEEL.

SPECIFICATION forming part of Letters Patent No. 727,825, dated May 12, 1903.

Application filed July 11, 1901. Serial No. 67,896. (No model.)

*To all whom it may concern:*

Be it known that I, JAMES MCCALLUM, a citizen of the United States, residing at Aurora, in the county of Kane and State of Illinois, have invented certain new and useful Improvements in Wagon-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements on cast-metal wheels of the type shown in Letters Patent No. 352,551, granted to me November 16, 1886.

The object of the invention is to provide in a wheel semicylindrical spokes preferably disposed face to face to materially strengthen the structure.

A further object of the invention is to provide a cast-metal wheel having U-shaped spokes and a hollow rim with a strengthening-rib.

Many other objects and advantages will be hereinafter referred to and be particularly pointed out in the claims.

In the drawings forming a part of this specification, Figure 1 is a perspective view of a wheel embodying my improvements. Fig. 2 is a detail section of the same. Fig. 3 is a transverse section on the line 3 3 of Fig. 1.

The same numerals refer to like parts in all the figures.

The hub 1 is of cylindrical formation and is cast around a hard steel or wrought-iron sleeve 2, which will be securely fastened by the shrinkage of the cast metal. It is obvious a new sleeve may be substituted when the old one becomes worn. The spokes 3 are cast integral with the hub and are semicircular or V-shaped in cross-section, each spoke radiating tangentially from the hub. However, I do not desire to be limited to tangent spokes, as strong and durable wheels are produced by making the spokes radiate direct from the center of the hub, and as I regard this construction of importance for some purposes I have filed a concurrent application claiming the structure specifically. The spokes 3 are arranged in two series, preferably with their open sides facing each other, thereby imparting to the wheel the necessary strength and at the same time minimizing the weight and effecting an economy in the quantity of metal. The rim 5 is U-shaped in cross-section and has a central rib 6, said rim and rib being cast integral with the spokes and hub. The tire 7 is provided with flanges 7ª and is shrunk on and is guided and positioned by the construction and arrangement of the rim.

My invention possesses many advantages over the present state of the art, in that a considerable reduction in the weight of the wheel is effected without the loss of the necessary strength. The construction and disposition of the spokes relative to the hub and rim effectually brace and strengthen the parts, so that it matters not at what angle a strain should come the wheel will withstand it. Likewise the rim is braced to form a substantial structure. It is practically impossible to loosen the tire once having been shrunk in position. It cannot be displaced laterally from either side, neither can it slip circumferentially. Hence the tire and rim become essentially one member.

Having thus fully described my invention, what I claim, and desire to secure by Letters Patent, is—

1. A cast-metal vehicle-wheel consisting of a hub, semihollow spokes cast integral with the hub, the hollow portion of some of said spokes being disposed in opposite directions from the others, and a rim connecting said spokes.

2. A cast-metal vehicle-wheel consisting of a hub, semicylindrical spokes cast integral with the hub and radiating tangentially therefrom with their open faces opposite each other.

3. A cast-metal wheel, the combination of a hub, semicylindrical spokes cast integral therewith, a U-shaped rim cast integral with the outer ends of the spokes, a tire shrunk on said rim, and a wrought-metal sleeve secured within the hub.

4. In a cast-metal wheel, the combination of the hub, semicylindrical spokes cast integral therewith, a semicylindrical rim cast integral with the outer ends of the spokes, a rib on said rim, and a tire shrunk on said rim.

5. In a cast-metal wheel, the combination of the hub, spokes cast integral therewith, a semicylindrical rim cast integral with the outer ends of the spokes, a rib in said rim, and a tire shrunk on said rim, the tire having flanges to fit the rim each side of its rib, said tire being shrunk on said rim.

6. In a cast-metal wheel, the combination of the hub, two sets of semicircular spokes cast integral therewith and being tangentially arranged and the faces disposed opposite each other, a U-shaped rim cast on the outer ends of spokes, a rib cast parallel with the rim and a tire adapted to fit the grooves formed in the rim by the rib, said tire being shrunk on said rim.

In testimony whereof I affix my signature in presence of two witnesses.

JAMES McCALLUM.

Witnesses:
   GEO. W. SWARTZ,
   M. JONES.